US009992610B2

(12) United States Patent
Michaud et al.

(10) Patent No.: US 9,992,610 B2
(45) Date of Patent: Jun. 5, 2018

(54) MINE WIFI AND METHOD (71) Applicants: Thomas Michaud, Norcross, GA (US);
Richard Hurst, Princeton, IN (US);
Michael W. Bertosh, Bethel Park, PA (US)

(72) Inventors: Thomas Michaud, Norcross, GA (US);
Richard Hurst, Princeton, IN (US);
Michael W. Bertosh, Bethel Park, PA (US)

(73) Assignee: Strata Products Worldwide LLC, Sandy Springs, GA (US)

( * ) Notice: Subject to any disclaimer, the term of this patent is extended or adjusted under 35 U.S.C. 154(b) by 375 days.

(21) Appl. No.: 14/290,755

(22) Filed: May 29, 2014

(65) Prior Publication Data
US 2014/0362729 A1 Dec. 11, 2014

Related U.S. Application Data (60) Provisional application No. 61/832,259, filed on Jun. 7, 2013.

(51) Int. Cl.
*H04B 7/10* (2017.01)
*H04W 16/26* (2009.01)
(Continued)

(52) U.S. Cl.
CPC ............ *H04W 4/008* (2013.01); *H04B 7/10* (2013.01); *H04W 4/80* (2018.02); *H04W 16/26* (2013.01);
(Continued)

(58) Field of Classification Search
CPC . H04W 4/008; H04W 16/26; H04W 72/0426; H04W 76/022; H04W 84/12; H04W 84/18
See application file for complete search history.

(56) References Cited

U.S. PATENT DOCUMENTS 7,110,762 B1 * 9/2006 Cameron ............... G01C 15/00
342/357.27
7,894,385 B1 * 2/2011 daCosta ............... H04W 84/18
370/328
(Continued)

FOREIGN PATENT DOCUMENTS

DE 3907733 A1 9/1990
JP 2010004457 A 7/2010
(Continued)

OTHER PUBLICATIONS

Mesh Dynamics, "Case Study: Increased Safety, Communications, Control, and Productivity in Underground Coal Mining," http://www.meshdynamics.com/documents/cs_mine_MINER.pdf, (Nov. 29, 2007).
(Continued)

*Primary Examiner* — Yaotang Wang
(74) *Attorney, Agent, or Firm* — Ansel M. Schwartz (57) ABSTRACT

A telecommunications system for a mine with tunnels having a plurality of nodes disposed in the tunnels in the mine which provides communication through WiFi with devices in the mine. Each node having a housing defining an enclosure, a first radio with a first antenna disposed at least partially in the enclosure within the housing directed for communication in a first direction relative to the node, a second radio with a second antenna disposed at least partially in the enclosure within the housing directed for communication in a second direction essentially opposite the first direction, and a power supply in electrical communication with the first and second radios to power the first and second radios. A method of a telecommunications system for a mine. A method of a Wifi node for a mine. A Wifi node for a mine. An apparatus for holding an object in a mine.

23 Claims, 8 Drawing Sheets

(51) Int. Cl.
*H04W 4/00* (2018.01)
*H04B 7/15* (2006.01)
*H04W 40/24* (2009.01)
*H04W 84/18* (2009.01)
*H04W 84/12* (2009.01)

(52) U.S. Cl.
CPC .............. *H04B 7/15* (2013.01); *H04W 40/24* (2013.01); *H04W 84/12* (2013.01); *H04W 84/18* (2013.01)

(56) References Cited

U.S. PATENT DOCUMENTS

| | | | | |
|---|---|---|---|---|
| 2006/0014491 A1* | 1/2006 | Cleveland | .......... | H04B 7/15571 455/17 |
| 2006/0205343 A1* | 9/2006 | Runyon | ............. | H04B 7/15542 455/11.1 |
| 2008/0137589 A1* | 6/2008 | Barrett | .............. | H04M 3/42348 370/327 |
| 2010/0159823 A1 | 6/2010 | Smith | | |
| 2010/0225554 A1* | 9/2010 | Huang | ............... | H01Q 15/0086 343/821 |
| 2011/0279344 A1* | 11/2011 | He | ....................... | H01Q 1/2291 343/852 |
| 2013/0078908 A1 | 3/2013 | Smith | | |
| 2014/0301235 A1* | 10/2014 | Ahn | ....................... | H04L 1/0027 370/252 |

FOREIGN PATENT DOCUMENTS

JP    2011211281 A    10/2011
WO    WO 2007/028361 A2    3/2007

OTHER PUBLICATIONS

Mesh Dynamics, "MD4000 Node Deployment and Trouble Shooting Guide," http://www.meshdnamics.com/documents/MD4000_HWMANUAL.pdf, (Sep. 10, 2014).

* cited by examiner

MINE WIFI AND METHOD

CROSS-REFERENCE TO RELATED APPLICATIONS

This application is related to U.S. provisional patent application Ser. No. 61/832,259 filed Jun. 7, 2013, incorporated by reference herein.

FIELD OF THE INVENTION

The present invention is related to WiFi in a mine using a node that has a first radio directed for communication in a first direction in the mine and a second radio directed for communication in a second direction in the mine essentially opposite the first direction. (As used herein, references to the "present invention" or "invention" relate to exemplary embodiments and not necessarily to every embodiment encompassed by the appended claims.) More specifically, the present invention is related to WiFi in a mine using a node that has a first radio directed for communication in a first direction in the mine and a second radio directed for communication in a second direction in the mine essentially opposite the first direction and which has a range of at least 2000 ft. in the first direction and the second direction.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Underground mining is harsh on hardware and harsh on RF. Physically, there are tight spaces with moving equipment that can strike the hardware or rocks can fall and shift that damage hardware. RF does not perform well either in the mine environment. The presence of a multitude of metal objects scatter RF, the makeup of rock/coal or other ore either absorbs or scatters RF at different frequencies. These and other issues cut down both the distance and speed wireless connections can provide in mines. For this reason fiber optic cable is commonly utilized as a carrier for communication in a mine.

BRIEF SUMMARY OF THE INVENTION

The present invention pertains to a telecommunications system for a mine with tunnels. The system comprises a plurality of nodes disposed in the tunnels in the mine which provides communication through WiFi with devices in the mine. Each node having a housing defining an enclosure, a first radio with a first antenna disposed completely in the enclosure within the housing directed for communication in a first direction relative to the node, a second radio with a second antenna disposed completely in the enclosure within the housing directed for communication in a second direction essentially opposite the first direction, and a power supply in electrical communication with the first and second radios to power the first and second radios.

The present invention pertains to a telecommunications system for a mine with tunnels. The system comprises a plurality of nodes disposed in the tunnels in the mine which provides communication through WiFi with devices in the mine. Each node having a housing defining an enclosure, a first radio with a first antenna disposed at least partly in the enclosure within the housing directed for communication in a first direction relative to the node, a second radio with a second antenna disposed at least partly in the enclosure within the housing directed for communication in a second direction essentially opposite the first direction, the first radio with the first antenna disposed within 18 inches of the second radio with the second antenna, and a power supply in electrical communication with the first and second radios to power the first and second radios.

The present invention pertains to an apparatus for holding an object in a mine from a first mine roof bolt and a second mine roof bolt in the roof of the mine. The apparatus comprises a bag having an opening through which the object is placed within the bag. A first strap extends from the bag having a first engagement portion that connects to the first mine bolt extending from the mine roof. A second strap extends from the bag having a second engagement portion that connects to the second mine bolt extending from the mine roof, the bag swinging on the first strap and the second strap when a force is applied to the bag.

The present invention pertains to a telecommunications system for a mine having a mine power source providing power at a first voltage. The system comprises a plurality of nodes. Each node having a power supply and a radio. The power supply of a first node of the plurality of nodes connected by a first power cable to the mine power source. The power supply of the first node providing power to the radio of the first node at a second voltage less than the first voltage. The power supply of a second node of the plurality of nodes connected by a second power cable to the power supply of the first node and receiving power at the first voltage from the power supply of the first node. The power supply of the second node providing power to the radio of the second node at the second voltage less than the first voltage.

The present invention pertains to a telecommunications system for a mine with tunnels. The system comprises a plurality of nodes disposed in the tunnels in the mine which provides communication through WiFi with devices in the mine. Each node having a housing defining an enclosure, a first radio with a first antenna disposed at least partly in the enclosure within the housing directed for communication in a first direction relative to the node, a second radio with a second antenna disposed at least partly in the enclosure within the housing directed for communication in a second direction essentially opposite the first direction, and a power supply in electrical communication with the first and second radios to power the first and second radios. The plurality of nodes simultaneously use FCC 47CFR 15.47 "802.11 WiFi" and 47CFR 15.211 "tunnel radio" on the first radio with the first antenna and the second radio with the second antenna, and there is dynamic frequency selection of non WiFi channels 2300~2400 Mhz and 2400~2500 Mhz for mesh internode connections while also providing 2412~2485 Mhz for standard 802.11 WiFi devices. The first radio of a first node of the plurality of nodes utilizes the non WiFi channels and the second radio of the first node utilizes the WiFi channels. In a second node of the plurality of nodes of a next hop, the first radio of the second node receives WiFi channels from the second radio of the first node while the second radio of the second node receives the non WiFi channels. In a third node of the plurality of nodes of a second hop, the first radio of the third node utilizes the non WiFi channels and the second radio of the third node utilizes the WiFi channels; one of two 20/40 Mhz channels are used centered at 2412 and 2462 which allows WiFi devices or the nodes to run on the upper or lower 20 Mhz of the channels while also providing an extra 20 Mhz for mesh connections to other nodes that does not interfere with WiFi devices.

The present invention pertains to a telecommunications system for a mine with tunnels. The system comprises a plurality of nodes disposed in the tunnels in the mine which provides communication through WiFi with devices in the mine. Each node having a housing defining an enclosure, a first radio with a first antenna disposed at least partly in the enclosure within the housing directed for communication in a first direction relative to the node, a second radio with a second antenna disposed at least partly in the enclosure within the housing directed for communication in a second direction essentially opposite the first direction, and a power supply in electrical communication with the first and second radios to power the first and second radios, wherein dynamic frequency selection is used to auto configure what channel to use.

The present invention pertains to a telecommunications system for a mine with tunnels. The system comprises a plurality of nodes disposed in the tunnels in the mine which provides communication through WiFi with devices in the mine. Each node having a housing defining an enclosure, a first radio with a first antenna disposed at least partly in the enclosure within the housing directed for communication in a first direction relative to the node, a second radio with a second antenna disposed at least partly in the enclosure within the housing directed for communication in a second direction essentially opposite the first direction, and a power supply in electrical communication with the first and second radios to power the first and second radio, wherein a signal to noise ratio "SNR" and RSSI for mesh connection between nodes is used while running in AP mode and providing 802.11 WiFi on the first radio and the second radio to audibly and visually see the status of a connection to another node connected via mesh protocol.

The present invention pertains to a telecommunications system for a mine with tunnels. The system comprises a plurality of nodes disposed in the tunnels in the mine which provides communication through WiFi with devices in the mine. Each node having a housing defining an enclosure, a first radio with a first antenna disposed at least partly in the enclosure within the housing directed for communication in a first direction relative to the node, a second radio with a second antenna disposed at least partly in the enclosure within the housing directed for communication in a second direction essentially opposite the first direction, and a power supply in electrical communication with the first and second radios to power the first and second radios. Each node self-contained and fully operational upon receiving power without needing to do anything else. Each node having a range of at least 2000 ft. in the first direction and the second direction.

The present invention pertains to a telecommunications system for a mine with tunnels. The system comprises a plurality of nodes disposed in the tunnels in the mine which provides communication through WiFi with devices in the mine. Each node having a housing defining an enclosure, a first radio with a first antenna disposed at least partly in the enclosure within the housing directed for communication in a first direction relative to the node, a second radio with a second antenna disposed at least partly in the enclosure within the housing directed for communication in a second direction essentially opposite the first direction, and a power supply in electrical communication with the first and second radios to power the first and second radios. The plurality of nodes defining a network having up to 200 mbps of throughput between radios of nodes at distances of up to about 1000 ft. and about 80 Mps at distances greater than about 1000 ft.

The present invention pertains to a WiFi node for a mine with tunnels. The node comprises a housing defining an enclosure, a first radio with a first antenna disposed completely in the enclosure within the housing directed for communication in a first direction relative to the node, a second radio with a second antenna disposed completely in the enclosure within the housing directed for communication in a second direction essentially opposite the first direction, and a power supply in electrical communication with the first and second radios to power the first and second radios.

The present invention pertains to a telecommunications system for a mine with tunnels. The system comprises a vehicle and a WiFi node disposed on the vehicle.

The present invention pertains to a method of a telecommunications system for a mine with tunnels. The method comprises the steps of providing with a plurality of nodes disposed in the tunnels in the mine communication through WiFi with devices in the mine. Each node having a housing defining an enclosure, a first radio with a first antenna disposed completely in the enclosure within the housing directed for communication in a first direction relative to the node, a second radio with a second antenna disposed completely in the enclosure within the housing directed for communication in a second direction essentially opposite the first direction; and powering with a power supply in electrical communication with the first and second radios the first and second radios.

The present invention pertains to a method of a WiFi node for a mine with tunnels. The method comprises the steps of placing the node in a mine. The node having a housing defining an enclosure, a first radio with a first antenna disposed completely in the enclosure within the housing directed for communication in a first direction relative to the node, a second radio with a second antenna disposed completely in the enclosure within the housing directed for communication in a second direction essentially opposite the first direction, and a power supply in electrical communication with the first and second radios to power the first and second radios; receiving by the node a signal from a WiFi device in the mine; and transmitting the signal by the node to another node.

The present invention pertains to a method of a telecommunications system for a mine with tunnels. The method comprises the steps of moving a vehicle in a mind; and receiving by a node on the vehicle a signal from a WiFi device in the mine.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 10:
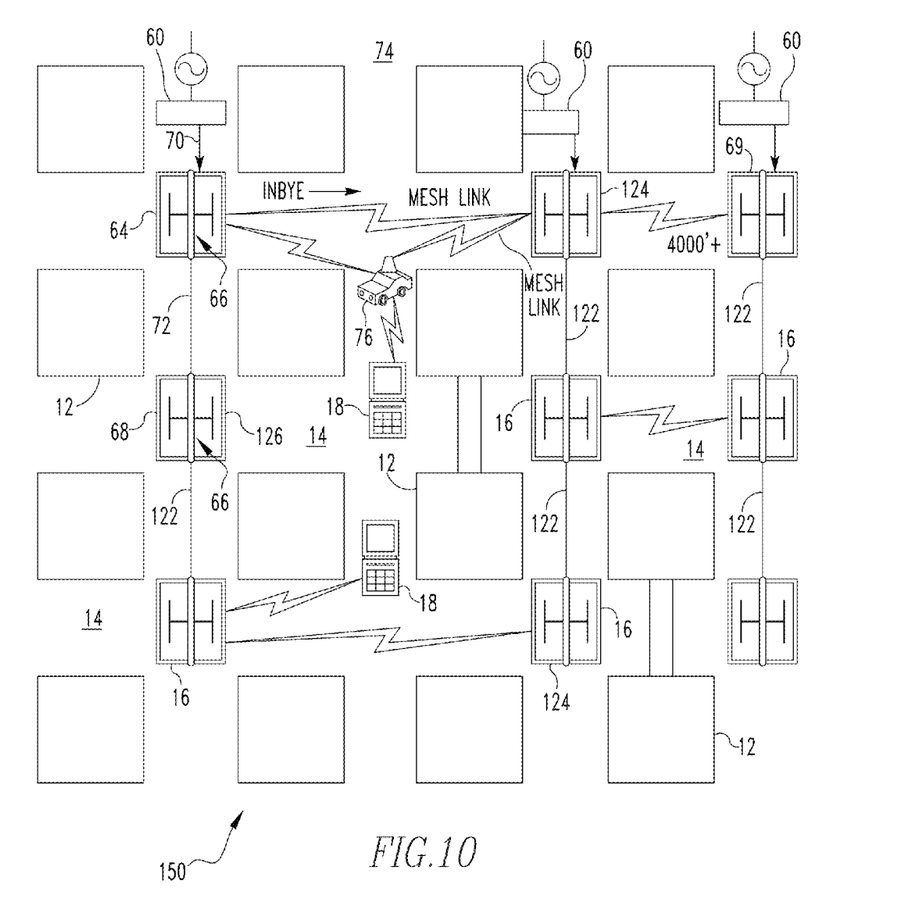
FIG. 10 is a schematic representation of a network.

Referring now to the drawings wherein like reference numerals refer to similar or identical parts throughout the several views, and more specifically to FIG. 10 thereof, there is shown a telecommunications system 10 for a mine 12 with tunnels 14. The system 10 comprises a plurality of nodes 16 disposed in the tunnels 14 in the mine 12 which provides communication through WiFi with devices 18 in the mine 12. Each node 16 has a housing 20 defining an enclosure 22, a first radio 24 with a first antenna 26 disposed at least partly in the enclosure 22 within the housing 20 directed for communication in a first direction 28 relative to the node 16, and a second radio 30 with a second antenna 32 disposed at least partly in the enclosure 22 within the housing 20 directed for communication in a second direction 34 essentially opposite the first direction 28, as shown in FIGS. 1, 2a, 2b, 6 and 8. The first radio 24 with the first antenna 26 is disposed within 18 inches of the second radio 30 with the second antenna 32. Each node 16 has a power supply 36 in electrical communication with the first and second radios 24, 30 to power the first and second radios 24, 30.

Figure 4:
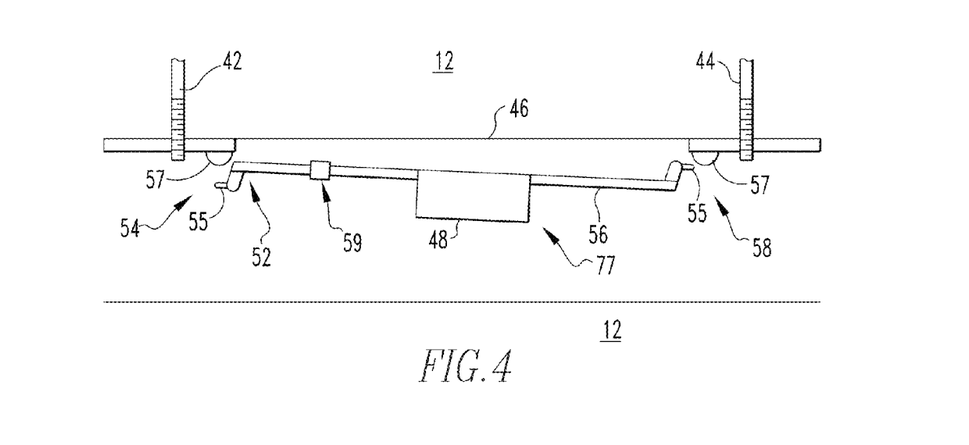
FIG. 4 is a representation of a bag which holds a node hanging from a mine roof.
Figure 9:
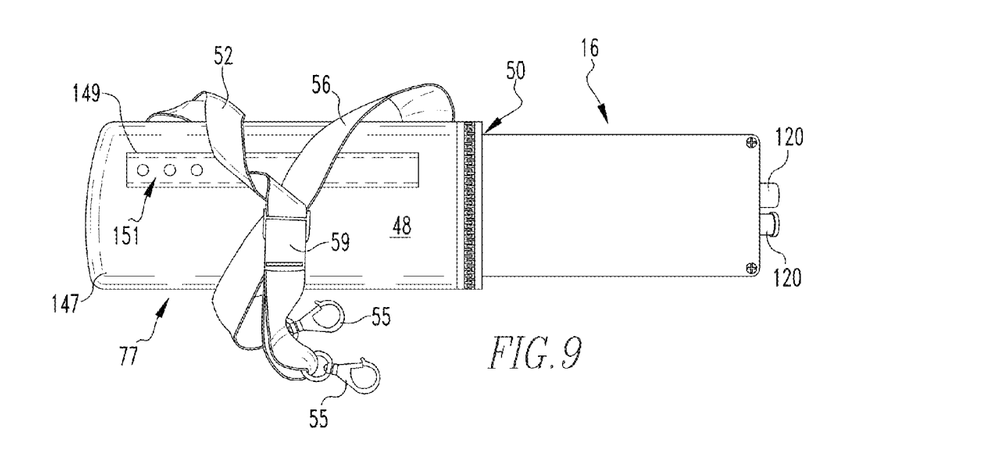
FIG. 9 is a representation of the node extending from the bag.

The first radio 24 with the first antenna 26 may be disposed completely in the enclosure 22 within the housing 20, and the second radio 30 with the second antenna 32 may be disposed completely in the enclosure 22 within the housing 20. The system 10 may include an attachment 77, which may have a first mine roof bolt 42 and a second mine roof bolt 44 in the roof 46 of the mine 12, a bag 48 having an opening 50 through which one of the nodes 16 of the plurality of nodes 16 is placed within the bag 48, a first strap 52 extending from the bag 48 having a first engagement portion 54 that connects to the first mine bolt extending from the mine roof 46, and a second strap 56 extending from the bag 48 having a second engagement portion 58 that connects to the second mine bolt extending from the mine roof 46, as shown in FIGS. 4 and 9. The bag 48 swinging on the first strap 52 and the second strap 56 when a force is applied to the bag 48.

The plurality of nodes 16 simultaneously may use FCC 47CFR 15.47 "802.11 WiFi" and 47CFR 15.211 tunnel radio 66 on the first radio 24 with the first antenna 26 and the second radio 30 with the second antenna 32, and there may be dynamic frequency selection of non WiFi channels 2300~2400 Mhz and 2400~2500 Mhz for mesh internode connections while also providing 2412~2485 Mhz for standard 802.11 WiFi devices 18. The first radio 24 of a first node 64 of the plurality of nodes 16 may utilize the non WiFi channels and the second radio 30 of the first node 64 utilizes the WiFi channels. In a second node 68 of the plurality of nodes 16 of a next hop, the first radio 24 of the second node 68 receives WiFi channels from the second radio 30 of the first node 64 while the second radio 30 of the second node 68 receives the non WiFi channels. In a third node 69 of the plurality of nodes 16 of a second hop, the first radio 24 of the third node 69 utilizes the non WiFi channels and the second radio 30 of the third node utilizes the WiFi channels. One of two 20/40 Mhz channels may be used centered at 2412 and 2462 which allows WiFi devices 18 or the nodes 16 to run on the upper or lower 20 Mhz of the channels while also providing an extra 20 Mhz for mesh connections to other nodes 16 that does not interfere with WiFi devices 18.

Dynamic frequency selection may be used to auto configure what channel to use. A signal to noise ratio "SNR" and RSSI for mesh connection between nodes 16 may be used while running in AP mode and providing 802.11 WiFi on the first radio 24 and the second radio 30 to audibly hear and visually see the connection's status to another node 16 connected via mesh protocol.

Each node 16 may be self-contained and fully operational upon receiving power without needing to do anything else. Each node 16 may have a range of at least 2000 ft. in the first direction 28 and in the second direction 34. The plurality of nodes 16 may define a network 74 having up to 200 mbps of throughput between radios of nodes 16 at distances of up to 1000 ft. and about 80 Mps at distances greater than 1000 ft.

The enclosure 22 may be waterproof and may have a front 80 and a back 82, at least a portion of each of the front 80 and the back 82 is made of a material that allows RF energy to penetrate. The first and second radios 24, 30 may support frequencies between 800 MHz and 2.5 GHz. The first and second radios 24, 30 support both IEEE 802.11b/g/n standards as well as a desired communication standard.

Figure 7:
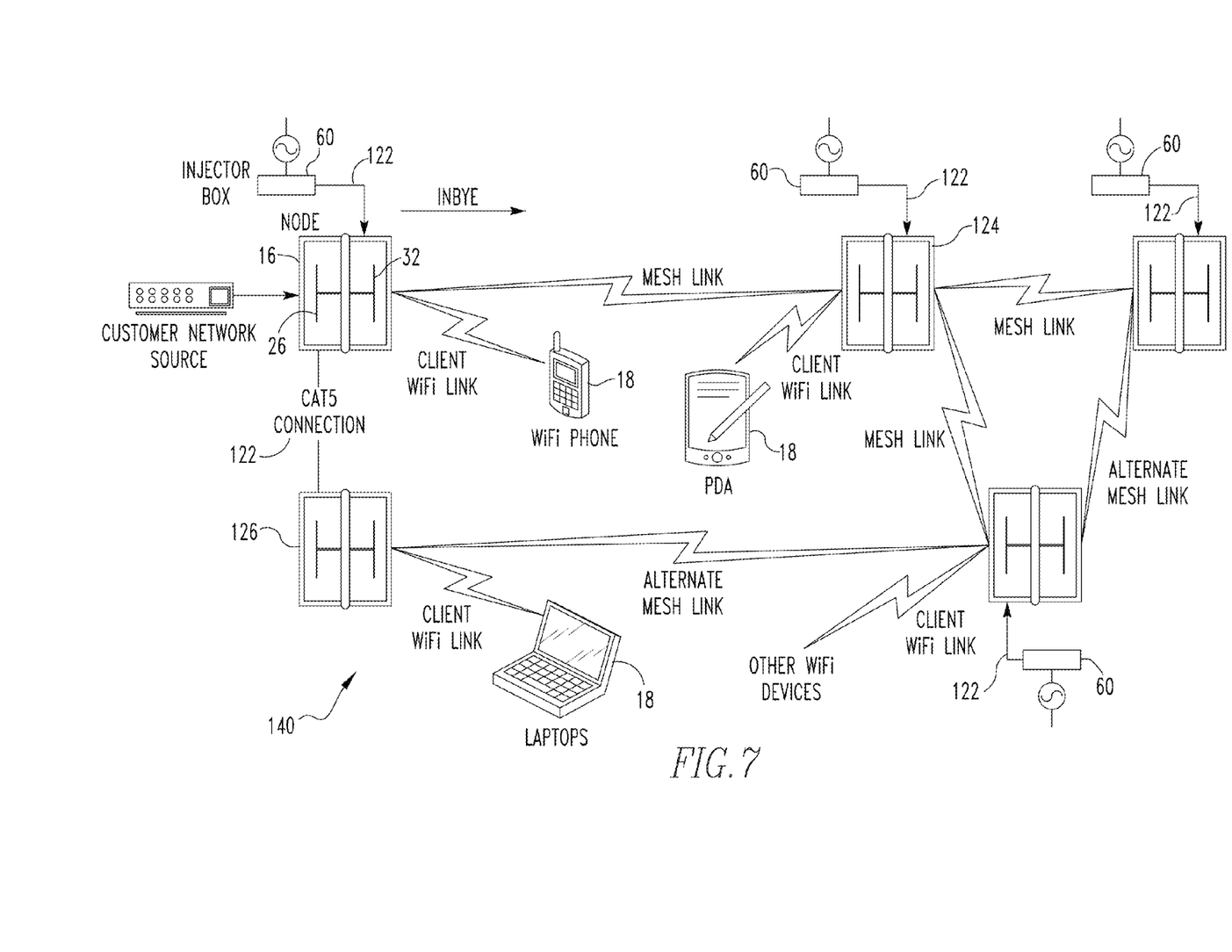
FIG. 7 is a schematic representation of a network.

The first antenna 26 may have most of its gain and directs RF radiation in a focused beam in the first direction 28, and the second antenna 32 may have most of its gain and directs RF radiation in a focused beam in the second direction 34. The power supply 36 may allow the first and second radios 24, 30 to be powered from a Power over Ethernet (PoE) source. The power supply 36 may support an input voltage range of 12-50 VDC. The first and second radios 24, 30 may operate either in a mesh configuration 150, as shown in FIG. 10, or in a point to point configuration 140, as shown in FIG. 7. Which configuration the first and second radios 24, 30 operate in may be changed remotely at any time after installation.

Figure 5A:
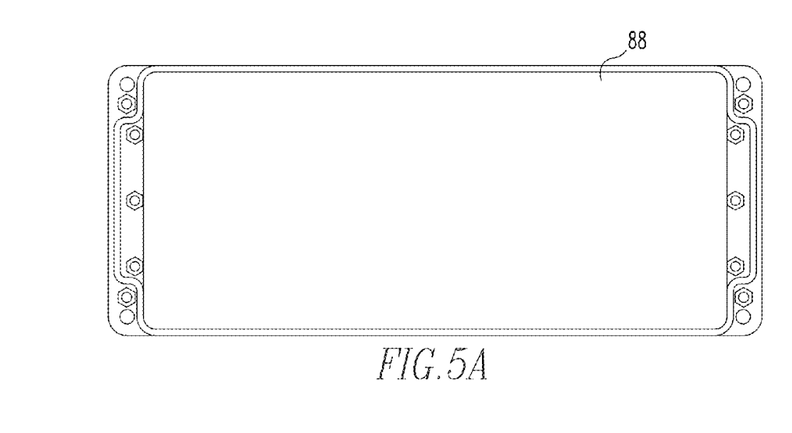
FIG. 5A is an overhead view of the housing.
Figure 5B:
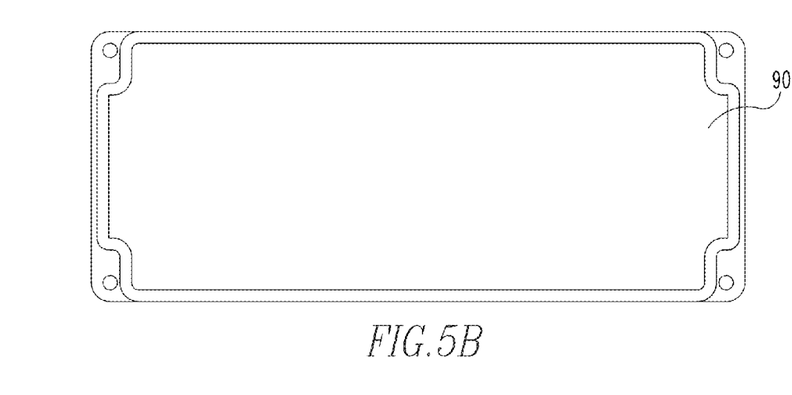
FIG. 5B is a bottom view of the housing.
Figure 5C:
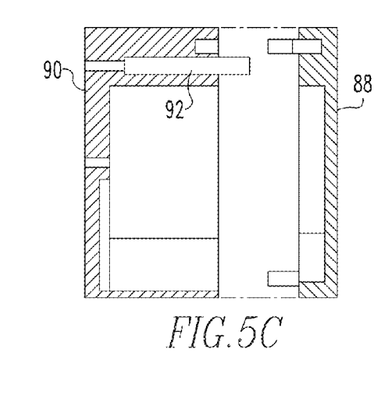
FIG. 5C is a cross-sectional side view of the housing.

The first radio 24 may be disposed on a first board 84 with a first plate 88. The second radio 30 may be disposed on a second board 86 with a second plate 90 bolted to the first plate 88 to form a sandwich 94, the sandwich 94 disposed in the enclosure 22 and bolted to the housing 20. The first antenna 26 may be separated by less than 12 inches from the second antenna 32. There may be at least 30 MHz between the first radio's channels and the second radio's channels. FIGS. 5a, 5b and 5c show the top, bottom and cross-sectional exploded views of the housing 20.

Figure 2A:
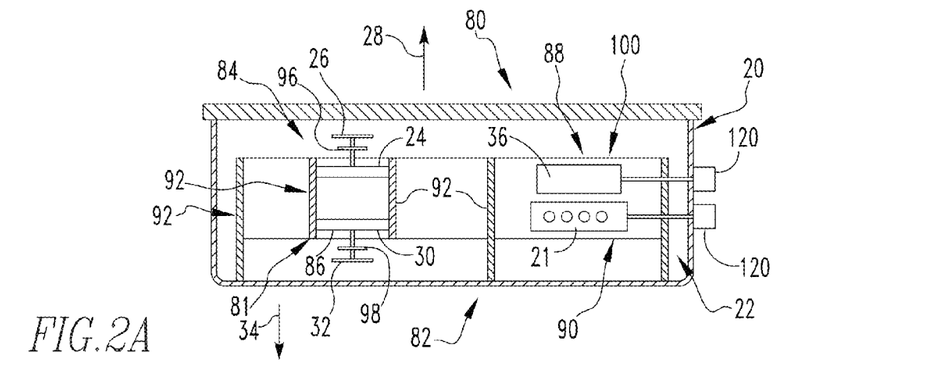
FIG. 2A is a representation of a cross-sectional cutaway view of the node.
Figure 2B:
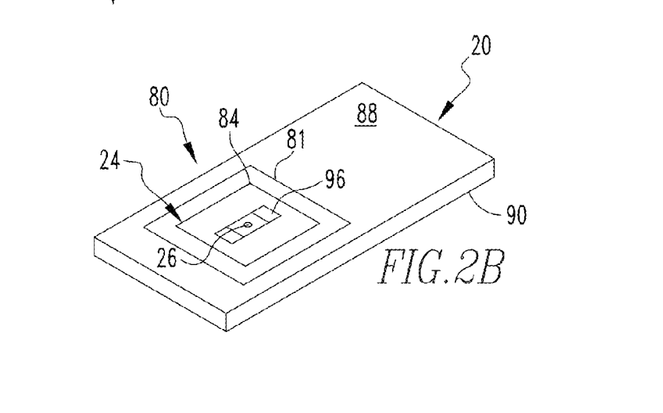
FIG. 2B is a representation of a perspective view of the node.

The first antenna 26 may be vertically polarized and the first radio 24 may have a third antenna 96 which is horizontally polarized and placed adjacent to and in parallel with the first antenna 26 with the third antenna 96 under the first antenna 26 and being longer than the first antenna 26, as shown in FIGS. 2a and 2b. The second antenna 32 may be vertically polarized and the second radio 30 may have a fourth antenna 98 which is horizontally polarized and placed adjacent to and in parallel with the second antenna 32 and under the second antenna 32 with the fourth antenna 98 being longer than the second antenna 32.

The present invention pertains to a telecommunications system 10 for a mine 12 having a mine power source 60 providing power at a first voltage, as shown in FIG. 10. The system 10 comprises a plurality of nodes 16. Each node 16 has a power supply 36 and a radio 66. The power supply 36 of a first node 64 of the plurality of nodes 16 is connected by a first power cable 70 to the mine power source 60. The power supply 36 of the first node 64 providing power to the radio 66 of the first node 64 at a second voltage less than the first voltage. The power supply 36 of a second node 68 of the plurality of nodes 16 connected by a second power cable 72 to the power supply 36 of the first node 64 and receiving power at the first voltage from the power supply 36 of the first node 64. The power supply 36 of the second node 68 providing power to the radio 66 of the second node 68 at the second voltage less than the first voltage. The operation of the first node 64 is described below and in regard to FIG. 3.

The present invention pertains to a WiFi node 16 for a mine 12 with tunnels 14. The node 16 comprises a housing 20 defining an enclosure 22. The node 16 comprises a first radio 24 with a first antenna 26 disposed completely in the enclosure 22 within the housing 20 directed for communication in a first direction 28 relative to the node 16. The node 16 comprises a second radio 30 with a second antenna 32 disposed completely in the enclosure 22 within the housing 20 directed for communication in a second direction 34 essentially opposite the first direction 28. The node 16 comprises a power supply 36 in electrical communication with the first and second radios 24, 30 to power the first and second radios 24, 30.

The present invention pertains to a telecommunications system 10 for a mine 12 with tunnels 14, as shown in FIG. 10. The system 10 comprises a vehicle 76. The present invention comprises a WiFi node 16 disposed on the vehicle 76.

The present invention pertains to a method of a telecommunications system 10 for a mine 12 with tunnels 14. The method comprises the steps of providing with a plurality of nodes 16 disposed in the tunnels 14 in the mine 12 communication through WiFi with devices 18 in the mine 12. Each node 16 has a housing 20 defining an enclosure 22, a first radio 24 with a first antenna 26 disposed completely in the enclosure 22 within the housing 20 directed for communication in a first direction 28 relative to the node 16, a second radio 30 with a second antenna 32 disposed completely in the enclosure 22 within the housing 20 directed for communication in a second direction 34 essentially opposite the first direction 28. There is the step of powering with a power supply 36 in electrical communication with the first and second radios 24, 30 the first and second radios 24, 30.

The present invention pertains to a method of a WiFi node 16 for a mine 12 with tunnels 14. The method comprises the steps of placing the node 16 in a mine 12. The node 16 has a housing 20 defining an enclosure 22, a first radio 24 with a first antenna 26 disposed completely in the enclosure 22 within the housing 20 directed for communication in a first direction 28 relative to the node 16, a second radio 30 with a second antenna 32 disposed completely in the enclosure 22 within the housing 20 directed for communication in a second direction 34 essentially opposite the first direction 28, and a power supply 36 in electrical communication with the first and second radios 24, 30 to power the first and second radios 24, 30. There is the step of receiving by the node 16 a signal from a WiFi device in the mine 12. There is the step of transmitting the signal wirelessly by the node 16 to another node 16.

The present invention pertains to a method of a telecommunications system 10 for a mine 12 with tunnels 14. The method comprises the step of moving a vehicle 76 in a mine 12. There is the step of receiving by a node 16 attached directly to the vehicle 76 a wireless signal from a WiFi device in the mine 12.

The present invention pertains to a telecommunications system 10 for a mine 12 with tunnels 14. The system 10 comprises a plurality of nodes 16 disposed in the tunnels 14 in the mine 12 which provides communication through WiFi with devices 18 in the mine 12. Each node 16 having a housing 20 defining an enclosure 22, a first radio 24 with a first antenna 26 disposed completely in the enclosure 22 within the housing 20 directed for communication in a first direction 28 relative to the node 16, a second radio 30 with a second antenna 32 disposed completely in the enclosure 22 within the housing 20 directed for communication in a second direction 34 essentially opposite the first direction 28, and a power supply 36 in electrical communication with the first and second radios 24, 30 to power the first and second radios 24, 30.

The present invention pertains to an apparatus 38 for holding an object 40 in a mine 12 from a first mine roof bolt 42 and a second mine roof bolt 44 in the roof 46 of the mine 12. The apparatus 38 comprises a bag 48 having an opening 50 through which the object 40 is placed within the bag 48. The apparatus 38 comprises a first strap 52 extending from the bag 48 having a first engagement portion 54 that connects to the first mine bolt extending from the mine 12 roof 46. The apparatus 38 comprises a second strap 56 extending from the bag 48 having a second engagement portion 58 that connects to the second mine bolt extending from the mine 12 roof 46. The bag 48 swinging on the first strap 52 and the second strap 56 when a force is applied to the bag 48.

Figure 1:
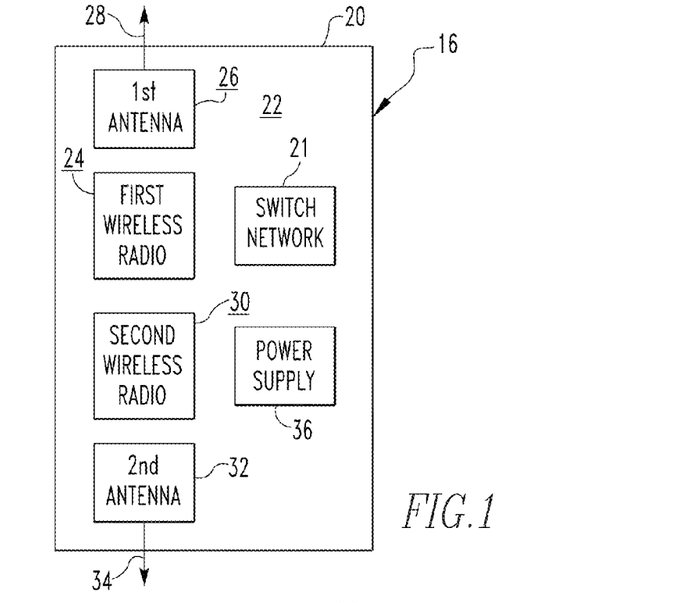
FIG. 1 is a block diagram of a node of the present invention.
Figure 8:
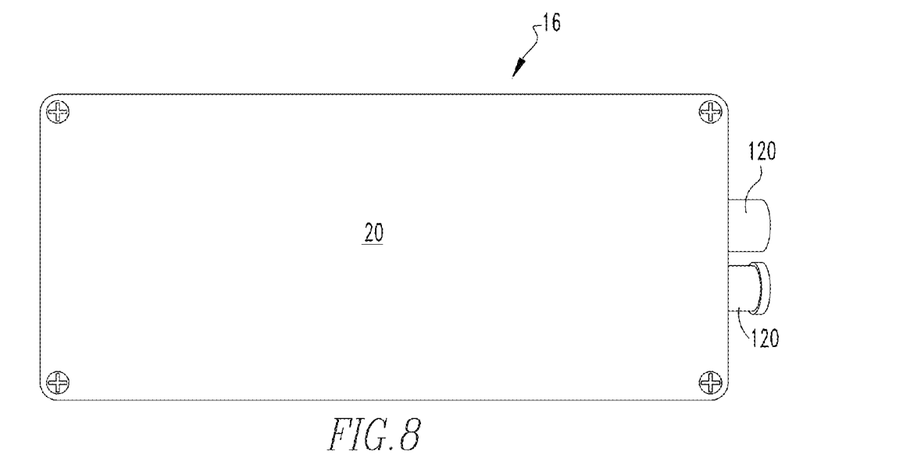
FIG. 8 is an overhead view of the node.

In the operation of the invention, the WiFi node 16, as shown in FIG. 8, has two modes of operation: The first is as an 802.11b/g/n access point and the second is as a communication backbone. Both modes contain the same physical hardware but operate utilizing one of these two methods. A plurality of nodes 16 comprises a system 10. The system 10 is designed to be deployed in underground mining environments. The self-contained hardware of the node 16 comprises two or more radios 66, internal antennas, power supply 36 and switch 21 components, as shown in FIG. 1.

External Box:

The wireless components will all be placed into a single waterproof box or housing 20. The box could be made from a variety of material but must have a material on the front 80 and back 82 to allow the RF energy to penetrate.

Wireless Radio 66:

The device will contain two or more wireless radios 66. The radios 66 can support both the IEEE 802.11b/g/n standards as well as a desired communication standard. The radios 66 can be configured to support frequencies between 800 MHz and 2.5 GHz (although addition spectrum could also be supported). Two radios 66 were chosen for a few reasons.

1) In a mesh or multi point system, with one radio 66, throughput is nearly halved for each hop. One radio 66 is used for each connection and so the node 16 does not have this limitation.
2) It was desired to have both a directional and small integrated antenna and the radio 66 board chosen has a small panel antenna on the board. A typical install in an entry requires at least 2 directions and sometimes 3 or more.

Antenna:

The node 16 also contains two or more self-contained antennas. The antennas are selected to allow for most of the gain to be in one direction and have minimal back or end fire. The antennas will be positioned in such a manner to direct energy to the desired directions. The node 16 will direct energy in opposite directions. These antennas could be of a variety of shapes and sizes including panel, patch, flat, microstrip, array, etc. The antenna must be located in the box to allow the RF energy to be directed out each direction. In a typical underground mine 12 there is no need for omni directional coverage since there are ribs "walls" on both sides and need coverage in two or more directions. By having a focused beam less energy is wasted on the ribs and more of it reaches the intended coverage area.

Power Supply 36:

The power supply 36 would allow all the components in the box to be powered from a Power Over Ethernet (PoE) source. The power supply 36 would support input voltage range of 12-50 VDC. The power supply 36 would convert this voltage to an acceptable voltage level for each component.

Switch 21 Network:

The switch 21 component's purpose is to provide communication between the two radios 66 and one or more outside entities. The communication could be Ethernet or IEEE 802.3, Mod-bus, CAN or a desired communication protocol. The switch 21 component could be a standard Ethernet Switch/Bridge or Ethernet Hub. All connections to outside Ethernet devices would be over a standard CAT 5, CAT 5e or CAT6 Ethernet cable 122, and which allows the nodes 16 to be daisy chained together.

Function:

This invention allows multiple wireless components to relay information into and out of underground mines. The components can also provide open access to 802.11b/g/n compliant devices 18 underground. The radios 66 can operate either in mesh configuration 150 or in a point to point configuration 140. The configuration is chosen at time of installation, so the node 16 is installed with the desired configuration. The configuration can be changed at any time after installation by logging into the node 16 through the established communication network 74, and changing the configuration.

The mine environment is very hard on RF. There are typically many metal objects that cause multipath. The type of mine absorbs RF at different frequencies. The mine 12 layout can also cause multipath issues.

Mesh:

When the nodes 16 are in a mesh configuration 150, as shown in FIG. 10, the network 74 will automatically determine the best route for information to travel. The mesh network 150 must be configured to reduce the probability of network 74 "loops" or the passing of data in a circular fashion.

One of two loop prevention techniques is used depending on the intended use of the node 16.

1) Wireless distribution system (WDS) with rapid spanning tree protocol (RSTP)
2) Or WDS with Hybrid Wireless Mesh Protocol (HWMP)

Point to Point:

When the nodes 16 are deployed in a point to point mode 140 of operation, as shown in FIG. 140, the node 16 will have an inbye face (into the mine 12) and an outbye face (out of the mine 12). The node 16 should be pointing in the correct direction for the connection to be established. The point to point link will utilize one or more frequencies to provide the maximum amount of data throughput and assist with noise immunization. A sticker is placed on one side of the node 16 and when deployed the sticker side of the node 16 faces inbye.

When the system 10 is deployed in a point to point fashion 140, the nodes 16 create a parent-child relationship with the next node 124 in the network 74. The nodes 16 are configured to uniquely identify the next node 124 and ignore the other radios contained within the same node 16. Connection rules applied to the node 16 allow connections to other nodes 16 but will not connect to nodes 16 directly connected to each other. This allows easy deployment with no user configuration needed.

Deployment:

The invention will be deployed by hanging the node 16 inside a bag 48 or wiring from the roof 46. The bag 48, as shown in FIG. 9, will include straps of 4-8' in length with hooks attached to the end of each strap. The hooks will be selected to easily hang the node 16 from the head wall or ceiling of the mine 12. The bag 48 could be made out of reflective material. FIGS. 4 and 9 show a bag 48 with straps.

Power:

The node 16 will be powered over one cable and will provide external communication to one or more wired devices 18 as well as multiple wireless devices 18, such as laptops, PDAs, phones and tablets. The nodes 16 will pass through the source power allowing multiple nodes to be daisy chained. Up to 4 or 5 nodes 16 may be daisy chained off of one mine power source 60.

Parts list:

1. Description: Housing 20 - 14.17" × 6.29" × 3.54"
    a. Qty: 1
    b. Manufacturer: Rose Bopla
    c. Part Number: 21636090
    d. Vendor: Rose Bopla or Digi-Key
2. Description: Wi-Fi Radios 66
    a. Qty: 2
    b. Manufacturer: Mikrotik
    c. Part Number: RBSXTG-2HND
    d. Vendor: Streakwave or ROCNOC
3. Description: POE Switch 21
    a. Qty: 1
    b. Manufacturer: Mikrotik
    c. Part Number: RB/750UP
    d. Vendor: Streakwave or ROCNOC
4. Description: CAT5 shielded cable gland 120 with 1' pigtail - (from outside node to node)
    a. Qty: 2
    b. Part Number: RJ45-ECS
    c. Vendor: Streakwave
5. Shielded patch cord 1' (between radio and switch in node)
    a. Qty: 2
    b. Manufacturer: l-com
    c. Part Number: TRD855SCR-1
    d. Vendor: L-com
6. Hex board standoff #6-32 ¼" bolts
    a. Qty: 8
    b. Manufacturer: keystone electronics or others
    c. Part Number: 8717K-ND
    d. Vendor: Digi Key
7. Hex board standoff #6-32 1 1.5" between board""
    a. Qty: 3
    b. Manufacturer: Keystone Electronics or others
    c. Part Number: 8422K-ND
    d. Vendor: Digi Key
8. Hex board standoff 6-32 1¾" between board
    a. Qty: 6
    b. Manufacturer: keystone
    c. Part Number: 8424K-ND
    d. Vendor: digi key
9. Button screws 6-32 × ⅜"
    a. Qty: 4
    b. Manufacturer: any
    c. Vendor: any (I got them at hardware store.)
10. Button Screw 6-32 × ¼"
    a. Manufacturer: any
    b. Vendor: any
11. Custom Mounting plate and top seal plate + enclosure machining
    a. Qty: 1 set
    b. Manufacturer: Cummings Engineering
    c. Part Number: Box Plate1
    d. Vendor: Cummings Engineering -continued Parts list:

12. Led light guide
   a. Part Number: 593-FLX302 light pipe 5 per node
   b. Venfor Mouser electronics
   c. Part Number: 593-THR22 light pipe lens 5 per node
   d. Vendor Mouser electronics Unique features of WiFi Nodes 16:
Simultaneous use of FCC 47CFR 15.47 "802.11 WiFi" and 47CFR 15.211 "tunnel radio" on the same radio/antenna. (for underground use only), Dynamic Frequency selection of custom non WiFi channels 2300~2400 Mhz and 2400~2500 Mhz for mesh inter-node connections while also providing 2412~2485 Mhz for standard 802.11 WiFi devices 18. Both operate in parallel at channels separate enough so there is no interference. First radio 24 on takes the lower channel and the second radio 30 on takes the higher channel. In next node 68 of next hop, the first radio 24 of next hop receives lower channel from first radio 24 of source and takes higher channel while second radio 30 of next hop takes lower channel. Third like first, and so on alternating.

One of two 20/40 Mhz channels are used centered at 2412 and 2462. This allows standard WiFi devices 18 or nodes 16 of the present invention to run on the upper or lower 20 Mhz of the channel while also providing an extra 20 Mhz for mesh connections to other nodes 16 that does not interfere with WiFi devices 18 in underground use only. This is only allowed underground as they would be licensed channels on the surface. 47CFR15.211 allows the use of these frequency's for underground use.

Dynamic frequency selection is used to auto configure what channel to use. This is done to allow no configuration from the user since most nodes 16 have two radios 66. One will run on the lower channel and one on the upper channel. The large amount of attenuation found in mines allows two channels to be enough for staggered reuse of channels. This way it does not matter how the nodes 16 are deployed, they won't interfere with each other.

Custom signal meter and signal to noise ratio "SNR" for mesh connection between nodes 16 while running in AP mode and providing 802.11 WiFi on the same radio/antenna. These features are normally only available while running in Station mode. Normal 802.11 WiFi devices 18 running in AP mode with WDS have no way easy way to monitor connections. The node 16 uses the RSSI and SNR to audibly and visually see the status of a connection to another node 16 connected via mesh protocol while ignoring client connections.

Only self-contained underground WiFi system available, 4~5 times more coverage from one node 16 than any other system currently in the market for underground use. Just plug in power and on. Tuning info to expand coverage at least 2000 ft. in mine 12 preferred 3750-4250. All other current purpose built underground WiFi systems use external antennas and coax cable that complicate the install and are easily damaged in the harsh environment. The node 16 has all components in a small durable housing 20 and the manner the nodes 16 are hanged allows them to take a shock/hit from vehicles 76 and continue to work afterwards. The walls of the housing 20 are about 3/16" thickness.

Use of multiple in multiple out (MIMO), placement/type of antenna, tuning of hardware retries and hardware fragmentation for the underground environment has increased the coverage distance considerably over other WiFi systems.

Considerably faster than any currently available underground radio systems, up to 200 mbps of throughput between radios at shorter distances and 80 Mps at node's maximum distance.

Targeted as a replacement of fiber, a way was needed to transport a high amount of data and standard WiFi protocol cannot do this. Node 16 uses the NV2 protocol with instream, and no use of carrier sense multiple access (CSMA) for the backhaul or backbone nodes 155.

Power input output range and method board (first board 84, second board 86).

This board allows 12~50v dc input and outputs both lower voltage for internal components and the higher input voltage is passed outside to allow daisy chaining multiple nodes 16.

In the operation of the node 16, it provides a fast, easy, and reliable replacement for fiber optic cable. This required the node 16 to have an operational distance of at least 4000' and speeds near 80 Mbps or more per node 16 to be suitable as a fiber replacement. Other observed underground wireless systems either combine fiber with wireless or only provide fully wireless to distances of 400~1000 feet and speeds far too low to replace fiber completely. The node 16 meets all these requirements without the need of any fiber optic cable.

To deal with the possibility of physical damage, and provide ease of installation, a small and sturdy self-contained system was chosen that only required the node 16 to be plugged into a mine power source 60 and hung with a bag 48 from roof bolts 92. A metal housing 20 could not be used for RF reasons and all of the tested polycarbonate cases were far too weak to effectively withstand typical forces that might be experienced, so a fiberglass reinforced polyester plastic was chosen to be used for the material of the housing 20 to define the housing 20. FIGS. 5A, 5B and 5C show different views of the housing 20. The housing 20 and glands 120 through which cables 122 extend into the housing 20 are all IR66 compliant. A bag 48 with adjustable straps and hooks was designed that easily adjusts to roof 46 bolt placement and quickly attaches to bolt flanges. The bag 48 is padded with padding 147 and the straps allow the node 16 to swing out of the way from equipment if struck. FIG. 9 shows a node 16 extending out of the bag 48 as it appears just before it is fully inserted in the bag 48.

Each radio 66 board/antenna is removed from the manufacture enclosure. A sandwich 94 of two radio boards with two UHMW plates are bolted together, and then the sandwich 94 is bolted into the enclosure 22 of the reinforced fiberglass housing 20. This sandwich 94 was created to be durable enough for mining and to prepare for MSHA drop tests. See FIGS. 2a and 2b. Without the sandwich 94, the radio boards easily broke loose and rattled around in the enclosure 22.

The self-contained enclosure 22 presented another issue to overcome due to the need for multiple radios 66 and antennas in such a small space where self-interference was a significant concern. Normal placement of antennas would require 3 feet or more of separation, but the node 16 design dictated separation of the antennas by less than 12 inches and even less than 1 inch. This small operational separation distance was achieved by placing 30 Mhz between the two channels (2382~2422)(2452~2492), one channel for each radio 66. These can be expanded or added to as needed. At a separation distance of ½" or ¼" with 30 MHZ between channels, there is still found some interference but it an acceptable level to meet the speed and distance needs in a mine 12 as set out here.

The node 16 contains four antennas, in a configuration where one is vertically polarized and one is horizontally polarized for each direction. The vertically polarized and horizontally polarized antennas are placed adjacent and in parallel but with the antenna under the other antenna being longer. This antenna configuration combined with MIMO facilitates multipath and increases the distance and throughput of communication in a mine 12 environment to that specified herein. Additionally, radio 66 hardware retries and fragmentation variables have been adjusted to perform better and acceptably in mines. The hardware retry value is between 4~7 depending on type of mine 12 in which the node 16 is used. There is a hardware fragmentation value between 1500~2312 depending on the type of mine 12 in which the node 16 is used. This is also known as MSDU (MAC service data unit).

To allow miners to quickly deploy nodes 16 by simply plugging them in to a power source, an auto configuration is used. Frequency selection, IP addressing, mesh link setup/tear down all are dynamic and happen with no input from the end user. Auto configuration can be over ridden if so chosen, but in most cases the default auto settings established with the node 16 will work fine. Auto configuration is established by the capability of the components, as provided by the vendors, chosen to be in the node 16. The auto configuration includes the use of DHDP.

Dynamic IP addresses are used for management only and are not needed to provide data service. Dynamic frequency selection is used to allow frequency reuse without configuration. Dynamic mesh setup is used to allow for movement of nodes 16 without user reconfiguration and also will allow the use of mobile repeater stations connected to mantrips.

When a node 16 is plugged in, its radio1 starts looking for a mesh WDS connection on a dedicated SSID for data transport to upstream/downstream nodes 16 and also starts servicing WIFI access on each radio 66. Once a connection to another node 16 is created it will start looking for a management IP from a DHCP server. Radio2 will start up slightly after radio1 and does the same thing. If no other nodes 16 are in range radio1 will pick the lower channel and radio2 will pick the upper channel. If other nodes 16 were found, radio1 will pick the channel with best noise floor and radio2 will run on the other and so on as nodes 16 are added.

In order to easily see the status of mesh links, a custom monitor script was made that looks at connections from an upstream or downstream node 16 attempting to connect via a specific SSID/WDS and based on the RSSI and SNR of the connection. For instance 3 signal levels can be used, although a $4^{th}$ and $5^{th}$ or several additional signal levels can also be used. The 3 signal levels that are used are:
  low=1 light RSSI greater than −85 & SNR between a first range 0 and 19
  mid=2 lights RSSI greater than −75 & SNR between a second range 20 and 34
  high=3 lights RSSI greater than −65 & SNR greater than a third range 35

The first led can be made to flash if no signal is present.

The script accordingly populates a set of LED lights on one of the radios 66 and also beeps in sequence to indicate the link status. The script is stored in each radio 66. This script ignores any client connections i.e. laptops, phones etc. A set of connection rules in the script assures only the nodes 16 can connect via this method and will not allow connections outside acceptable ranges.

The script first checks to see if any mesh connections exist. If not, it sleeps then checks again. Once one or more mesh connections are found, the script looks at the one with the highest RSSI and takes its RSSI and SNR values and populates each led based on these values.

The connection rules only allow a mesh connection from devices 18 matching the Strata OUI mac address. If the mac matches this, a $2^{nd}$ rule for signal level only accepts the mesh connection if the RSSI and SNR are within acceptable levels to meet the distance and speed requirement for a fiber replacement. A Wifi connection can come from any device and does not use any connection rules. No optical fiber connection is needed for communication.

Housing 20 specs:
14.17"×6.30"×3.58"
Technical Data:
  Color: Gray is standard similar to RAL 7000.
  Material: Fiberglass reinforced Polyester plastic.
  Impact Resistance: >7 Nm, EN50014.
  Flammability: Self-extinguishing, UL 94 V0.
  Gasket Temperature Range:
  Polyurethane Foam Gasket −40° F. to +194° F.
  Silicone Foam Gasket −76° F. to +266° F.
  Neoprene Gasket −40° F. to +212"F
  RFI Gasket −40° F. to +392° F.
  Captive Stainless Steel Lid Screws.
  Surface Resistance: >$10^{12}$ static resistance Ohm to DIN 53482.
  Disruptive Strength: 18 KV/mm to DIN 53482.
  Toxicity: Halogen Free.
  Protection Classifications:
  NEMA Types: up to Nema 4, 4×
  IP 66, EN 60529

Figure 3:
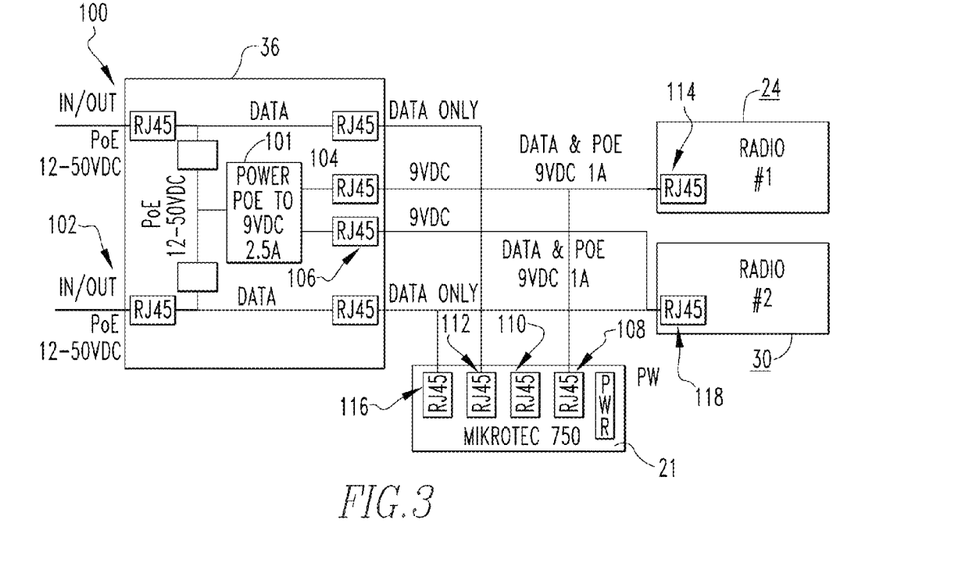
FIG. 3 is a schematic representation of the node.

As shown in FIG. 3, the power supply 36 has two input/output ports 100, 102 through which 12-50 V DC is received or sent out from the power supply 36 through MSHA approved glands 120. The two input/output ports 100, 102 are shorted together so that each of the two input/output ports has the same voltage. In this way the voltage received at one input/output port is sent out at the same voltage from the second input/output port. This allows the nodes 16 to be connected together, one to the next, in a daisy chain fashion to receive and then send out power to the next node 16, and so on. Generally, 4 to 5 nodes 16 can be linked together by running a power cable to a first input/output port 100 of the power supply 36 of a first node 64 and then running a second power cable 72 between the second input/output port of the power supply 36 of the first node 64 to another input/output port of a power supply 36 of a second node 68 and so on to a third and then to a fourth and possibly to a fifth node to provide power to each of the nodes 16. The source of the power is from typical power sources 62 at various locations throughout the mine 12. In this way, many groups of up to four or five nodes 16 can be easily powered. All input/output ports used are standard Ethernet connectors, and are well known as RJ45 power over Ethernet connectors.

To support the internal components of the node 16, the first input/output port 100 that has received power, drops the voltage down to 9 V at a converter 101 and sends the power to a third input/output port 104 of the power supply 36 of the node 16 and also to a fourth input/output port 106 of the power supply 36 of the first node 64. The third input/output port 104 is connected to a first input/output port 100 of an Ethernet switch and to the first radio 24 to provide power switch 21 at 9 V. The fourth input/output port 106 of the power supply 36 is connected to a second input/output port 110 of the Ethernet switch 21 and the second radio 30 to provide power at 9 V. A third input/output port 112 of the Ethernet switch 21 is connected to an input/output port 118 of the first radio 24 and provides switched Ethernet data to the first radio 24. A fourth input/output port 116 of the Ethernet switch 21 provides switched data to a first input/output port 118 of the second radio 30.

In addition, with this configuration, data from the radios 66 is transmitted and received through standard power over Ethernet communication, as is well known in the art, via the input/output port connections that have just been described in regard to power. As stated above, all of the input/output ports described are RJ45 Ethernet connectors. The data in regard to the first and second radios 24, 30 is always sent as a first choice through the cabling via the internal connectivity when available. In the event the cable path for the data is broken for whatever reason, the radios 66 then communicate wirelessly from node to node.

The node 16 is positioned in the mine 12 with a bag 48 that holds the node 16, as shown in FIGS. 4 and 9. The bag 48 is fixed to the mine roof 46 with two mine roof bolts 42, 44. The bag 48 has a strap 52, 56 on each side that extends from the bag 48 to the mine roof bolt on each side. One or both of the straps can be adjustable. Each strap clips with clips 55 to a hook 57 that is commonly found on the flange of a mine roof bolt. As FIG. 4 shows, the bag 48 is positioned to span across the width of the mine 12 tunnel. The first strap 56 may include an adjustment 59 to better position the bag hanging from the roof 46 so the bag 48 hanging close to the roof 46. FIG. 4 shows the bag 48 as it would appear to a driver driving a vehicle 76 in the tunnel toward the bag 48.

By the bag 48 hanging from the mine roof bolts through the straps, the node 16 is able to move out of the way of a vehicle 76 which strikes it to avoid damage. The node 16 in the bag 48 hanging from the mine roof 12 repeatedly survived without any damage vehicles 76 going at about 20 mph hitting the bag 48 with the node 16 in it. Additionally, the node 16 itself survived without any damage being dropped at least five times from a height of 8 feet to ground, and continued to be fully operational. Furthermore, the bag 48 has a padding liner 147 that is about ½" thick insulation—foam or cotton—along the interior walls of the bag 48 to further protect the node 16 in the bag 48. There is a Velcro slit across the top of the bag 48 through which the node 16 is positioned in the bag 48. Once in the bag 48, the Velcro slit is closed to contain the bag 48. The node 16 is positioned on its side in the bag 48 so that one set of antennae is directed in each direction of the tunnel, that is one vertically polarized antenna and one horizontally polarized antenna are directed inbye and one vertically polarized antenna and one horizontally polarized antenna are directed outbye. The bag 48 has a plastic window 149 so the LEDs 151 can be seen through the window.

Figure 6:
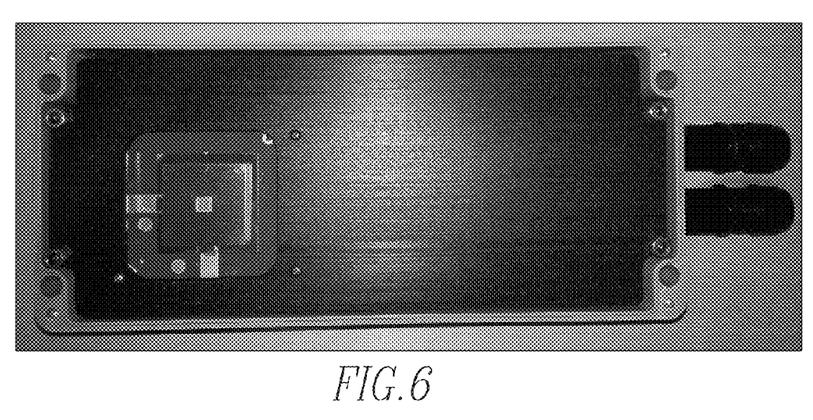
FIG. 6 is a computer-generated photograph of the node.

FIGS. 2a, 2b and 3 show a side representation, perspective representation and a block diagram, respectively, of the node 16. Each antenna and radio 66 is removed from the packaging as received from the manufacturer. The first antennas 26 and radio 66 and the second antennas 32 and radio 66 are bolted together in the form of a sandwich 94 with a top plate and a bottom plate of the sandwich 94. Each of the antennas of a radio 66 point outward away from the other antennas of the other radio 66. The sandwich 94 is formed by having both antenna and radio boards bolted together to the top plate and bottom plate. In turn, the bottom plate is bolted to the bottom of the housing 20. There is a slot 81 cut into the top plate and the bottom plate from which a respective set of antennae extends. FIG. 6 shows a top perspective view of the top plate of the sandwich 94 with the slot for the antennae of the first radio 24 to extend. The switch and the power supply 36 are disposed alongside the radio 66 and antenna and positioned between the top plate in the bottom plate. The description of the power provided to the components was explained above.

Installing WiFi Nodes 78

To install the first entry of coverage normally the travel way and with reference to FIG. 7: Starting at a point of handoff to another network, i.e. a fiber or other customer network source and power source, a node 16 should be plugged in to a mine power source 60 and cat5 data/power cable 122 connected. The node 16 should be placed and hung in the bag 48 so one antenna faces inbye and the other outbye. Then to find the correct area to place the next inbye node 124, a portable power source 60 can be connected to the next node 124 and the next node 124 is moved inbye while watching the LEDs 151. The next node 124 is continued to be moved to the desired location or until only one of the LEDS are on. A new mine 12 power source 60 is connected to the next node 124 through a cat5/power cable 122. Additional nodes 16 are placed throughout the mine 12 in the same manner creating wireless backhaul of nodes 16. Additional nodes 16 are placed throughout the mine 12 as needed, until all areas in the mine 12 requiring coverage have communication capability. If multiple parallel entries are needed a cat5 cable 122 from one power source can be run between entries to create a daisy chain in and out of each node 16, only one entry needs to be tested for signal levels; other entries may or may not have a wireless connection to inbye nodes 16. If they do, it will be used as an alternate for redundancy only. A node 16 can have several power sources connected to it. For instance, there can be cat5 cable 122 carrying power and data to it from another node 16, and a power cable from a mine power source 60 connected to the node 16. If the cat5 cable 122 from the other node 16 is cut or damaged, power from the mine power source 60 continues to power the node 16 so the node 16 can continue to communicate through its WiFi capability with other nodes 16.

Data path from client to customer network or other devices 18 on network 74:

With reference to FIG. 10, a client WiFi is made to the nearest node 16 from a client device 18. Data leaving this device 18 travels across the WiFi link to a radio 66 inside the node 16. It is then passed to either the $2^{nd}$ radio 66 via switch connection in the node 16 for the next node 16 in line via wireless mesh connection depending on which node 16 of the mesh has the shortest path to the intended recipient. As the data reaches the $2^{nd}$ node 124 in line, it enters one radio 66 and is passed to the switch 21 then passed to the other radio 66. The other radio 66 sends the data upstream via the mesh. This continues until the data reaches its intended destination where it is either passed to the customer network 74, other Ethernet device, or another wireless device 18 depending where the data was intended to go.

In the alternative, or in addition to the mesh network 150 for additional throughput, a point to point path can be provided.

In order to provide better coverage for traveling equipment, such as vehicles 76 as shown in FIG. 10, and better cross cut coverage when pulling into a cross cut to allow other traffic to pass, a node 16 may be attached onto the traveling equipment. This will provide both a data uplink via mesh and provide WiFi services to devices 18 in and around the equipment. The node 16 will be powered from the traveling equipment's 12v source, such as the battery, or motor when on. Traveling equipment with a repeater node 16 attached will also normally have a voip phone connected directly to the node 16 via cat5 cable 122 to provide phone service for anyone in the traveling equipment without handing out wireless phones to every miner. The use of dynamic mesh is very well suited for this type of mobile system 10. The node 16 is simply positioned in the traveling equipment or fixed by a bracket to the traveling equipment, and a cable from the electrical system of the traveling equipment is connected with the node 16 to power the node 16.

Figure 11:
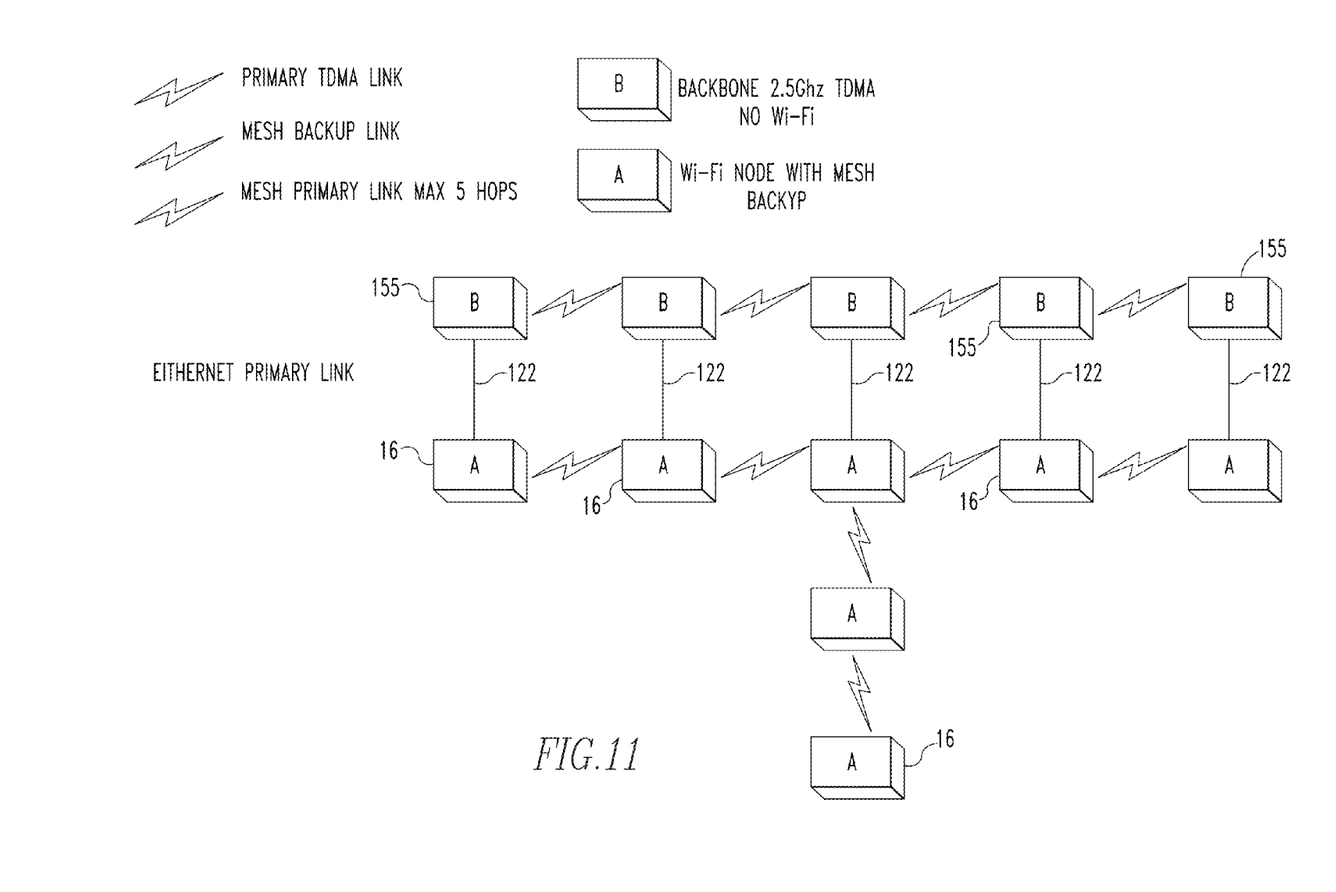
FIG. 11 is a schematic representation of a network.

FIG. 10 shows how to create both a daisy chain from power/data for multiple entry coverage and also create a mesh or point to point wireless connection to up/downstream nodes 16. FIG. 11 shows how both B nodes and A nodes can be used for larger deployments or increased throughput. FIG. 11 shows 5 hops on A nodes. The network shown in FIG. 11 can support about 20 or more hops.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A telecommunications system for a mine with tunnels comprising:
a plurality of nodes disposed in the tunnels in the mine which provides communication through WI-FI with devices in the mine, each node having a housing defining an enclosure, a first radio with a first antenna completely disposed in the enclosure within the housing directed for communication in a first direction relative to the node, a second radio with a second antenna completely disposed in the enclosure within the housing directed for communication in a second direction essentially opposite the first direction, the first radio with the first antenna disposed within one inch of the second radio with the second antenna, and a power supply in electrical communication with the first and second radios to power the first and second radios.

2. The system of claim 1 including an attachment which holds one node of the plurality of nodes to a tunnel of the mine.

3. The system of claim 2 wherein the plurality of nodes simultaneously use FCC 47CFR 15.47 "802.11 WI-FI" and 47CFR 15.211 tunnel radio on the first radio with the first antenna and the second radio with the second antenna, and there is dynamic frequency selection of non WI-FI channels 2300~2400 Mhz and 2400~2500 Mhz for mesh internode connections while also providing 2412~2485 Mhz for standard 802.11 WI-FI devices, the first radio of a first node of the plurality of nodes utilizes the non WI-FI channels and the second radio of the first node utilizes the WI-FI channels, in a second node of the plurality of nodes of a next hop, the first radio of the second node receives WI-FI channels from the second radio of the first node while the second radio of the second node receives the non WI-FI channels, in a third node of the plurality of nodes of a second hop, the first radio of the third node utilizes the non WI-FI channels and the second radio of the third node utilizes the WI-FI channels; one of two 20/40 Mhz channels are used centered at 2412 and 2462 which allows WI-FI devices or the nodes to run on the upper or lower 20 Mhz of the channels while also providing an extra 20 Mhz for mesh connections to other nodes that does not interfere with WI-FI devices.

4. The system of claim 3 wherein dynamic frequency selection is used to auto configure what channel to use.

5. The system of claim 4 wherein a signal to noise ratio "SNR" and RSSI for mesh connection between nodes is used while running in AP mode and providing 802.11 WI-FI on the first radio and the second radio to audibly hear and visually see the connection's status to another node connected via mesh protocol.

6. The system of claim 5 wherein each node is self-contained and fully operational upon receiving power without needing to do anything else, each node having a range of at least 2000 ft. the first direction and the second direction.

7. The system of claim 6 wherein the plurality of nodes defining a network having up to about 200 mbps of throughput between radios of nodes at distances of up to about 1000 ft. and about 80Mps at distances greater than about 1000 ft.

8. The system of claim 7 wherein the attachment includes a first mine roof bolt and a second mine roof bolt in the roof of the mine, a bag having an opening through which one of the nodes of the plurality of nodes is placed within the bag, a first strap extending from the bag having a first engagement portion that connects to the first mine bolt extending from the mine roof, and a second strap extending from the bag having a second engagement portion that connects to the second mine bolt extending from the mine roof, the bag swinging on the first strap and the second strap when a force is applied to the bag.

9. The system of claim 8 wherein the enclosure is waterproof and has a front and a back, at least a portion of each of the front and the back is made of a material that allows RF energy to penetrate.

10. The system of claim 9 wherein the first and second radios support frequencies between 800 MHz and 2.5 GHz.

11. The system of claim 10 wherein the first and second radios support both IEEE 802.11b/g/n standards as well as a desired communication standard.

12. The system of claim 11 wherein the first antenna has most of its gain and directs RF radiation in a focused beam in the first direction, and the second antenna has most of its gain and directs RF radiation in a focused beam in the second direction.

13. The system of claim 12 wherein the power supply allows the first and second radios to be powered from a Power over Ethernet (PoE) source.

14. The system of claim 13 wherein the power supply supports an input voltage range of 12-50 VDC.

15. The system of claim 14 wherein the first and second radios operate either in a mesh configuration or in a point to point configuration.

16. The system of claim 15 wherein which configuration the first and second radios operate in can be changed at any time after installation.

17. The system of claim 16 wherein the first radio is disposed on a first board with a first plate, the second radio is disposed on a second board with a second plate in parallel with the first plate and bolted to the first plate to form a sandwich, the sandwich disposed in the enclosure and bolted to the housing.

18. The system of claim 17 wherein there is at least 30 MHz between the first radio's channels and the second radio's channels.

19. The system of claim 18 wherein the first antenna is vertically polarized and the first radio has a third antenna which is horizontally polarized and placed adjacent to and in parallel with the first antenna with the third antenna under the first antenna and being longer than the first antenna; the second antenna is vertically polarized and the second radio has a fourth antenna which is horizontally polarized and placed adjacent to and in parallel with the second antenna and under the second antenna with the fourth antenna being longer than the second antenna.

20. The system of claim 19 including a vehicle and another node of the plurality of nodes disposed on the vehicle.

21. A method of a telecommunications system for a mine with tunnels comprising the steps of:
provinding with a plurality of nodes disposed in the tunnels in the mine communication through WI-FI with devices in the mine, each node having a housing defining an enclosure, a first radio with a first antenna disposed completely in the enclosure within the housing directed for communication in a first direction relative to the node, a second radio with a second antenna disposed completely in the enclosure within the housing directed for communication in a second direction essentially opposite the first direction, the first radio with the first antenna disposed within one inch of the second radio with the second antenna; and
powering with a power supply in electrical communication with the first and second radios the first and second radios.

22. The method of claim 21 including the steps of:
moving a vehicle in a tunnel of the mine;
receiving by a node of the plurality of nodes on the vehicle a signal from a WI-FI device in the mine; and
transmitting the signal to another node.

23. A telecommunications system for a mine with tunnels comprising:
a plurality of nodes disposed in the tunnels in the mine which provides communication through WI-FI with devices in the mine, each node having a housing defining an enclosure, a first radio with a first antenna completely disposed in the enclosure within the housing directed for communication in a first direction relative to the node, a second radio with a second antenna disposed at least partly in the enclosure within the housing directed for communication in a second direction essentially opposite the first direction, the first radio with the first antenna disposed within one inch of the second radio with the second antenna, and a power supply in electrical communication with the first and second radios to power the first and second radios, the first antenna is vertically polarized and the first radio has a third antenna which is horizontally polarized and placed adjacent to and in parallel with the first antenna with the third antenna under the first antenna and being longer than the first antenna; the second antenna is vertically polarized and the second radio has a fourth antenna which is horizontally polarized and placed adjacent to and in parallel with the second antenna and under the second antenna with the fourth antenna being longer than the second antenna.

* * * * *